United States Patent [19]

Mazaki

[11] 4,237,178
[45] Dec. 2, 1980

[54] SOUND PROOF MATERIALS FOR BUILDINGS

[75] Inventor: Tadashige Mazaki, Tokyo, Japan
[73] Assignee: Hideo Sakai, Tokyo, Japan
[21] Appl. No.: 43,016
[22] Filed: May 29, 1979
[30] Foreign Application Priority Data
Jun. 16, 1978 [JP] Japan .................. 53-72047
[51] Int. Cl.³ .............................................. B32B 5/16
[52] U.S. Cl. ................................. 428/242; 181/290; 181/294; 428/246; 428/251; 428/253; 428/263; 428/268; 428/273
[58] Field of Search ............... 428/228, 242, 245, 251, 428/253, 254, 263, 268, 273, 246; 181/290, 291, 294; 52/145, 146

[56] References Cited
U.S. PATENT DOCUMENTS

| | | |
|---|---|---|
| 3,253,947 | 5/1966 | McCluer et al. ..................... 428/242 |
| 3,615,276 | 10/1971 | Singleton ............................. 428/263 |
| 3,622,432 | 11/1971 | McCluer ............................... 428/263 |

Primary Examiner—James J. Bell
Attorney, Agent, or Firm—Maky, Renner, Otto & Boisselle

[57] ABSTRACT

Sound proof materials for buildings are disclosed. This material is prepared by mixing powdery lead with an impregnating resin, a solvent, a plasticizer and the like and then applying them on at least one side of a glass cloth.

4 Claims, 4 Drawing Figures

SOUND PROOF MATERIALS FOR BUILDINGS

This invention relates to sound proof materials for buildings and more particularly to sound proof materials suitable for use in road noise separating walls or sound proof and noise separating members for block or concrete building.

Recently, environmental noise comes into question in all quarters. For instance, there are landing and takeoff noises in the vicinity of an airport, noise near a highway, noise produced from a music room and the like. As a means for prevention of environmental noise, sound proof materials for construction and building are required to separate and insulate these noises from exterior or interior. Further, these materials are required to have fire proofness and moisture proofness.

It is, therefore, an object of the invention to provide sound proof materials which satisfy all of the aforementioned requirements and can easily be produced.

The inventor has aimed at that metallic lead has an excellent noise-separating effect but cannot directly be used as a building material because a foil of metallic lead itself has a low strength and no tackiness, and made various studies with respect to the development of sound proof materials having the same noise-separating effect as the metallic lead and a high strength and capable of easily using as the building material, and as a result, the invention has been accomplished.

According to the invention, a sound proof material is prepared by kneading powdery lead of about 100-350 mesh (JIS Z-8801), preferably about 280 mesh with an impregnating resin containing a plasticizer and the like, applying them on at least one side of a glass cloth, and rolling and drying it. If necessary, the kneaded mass may be applied on both sides of the glass cloth.

In another embodiment of the invention, glasswool layer, rockwool layer and the like may further be adhered to the lead coating formed on the side of the glass cloth as mentioned above.

The invention will now be described in greater detail with reference to the accompanying drawings, wherein.

Figure 1:
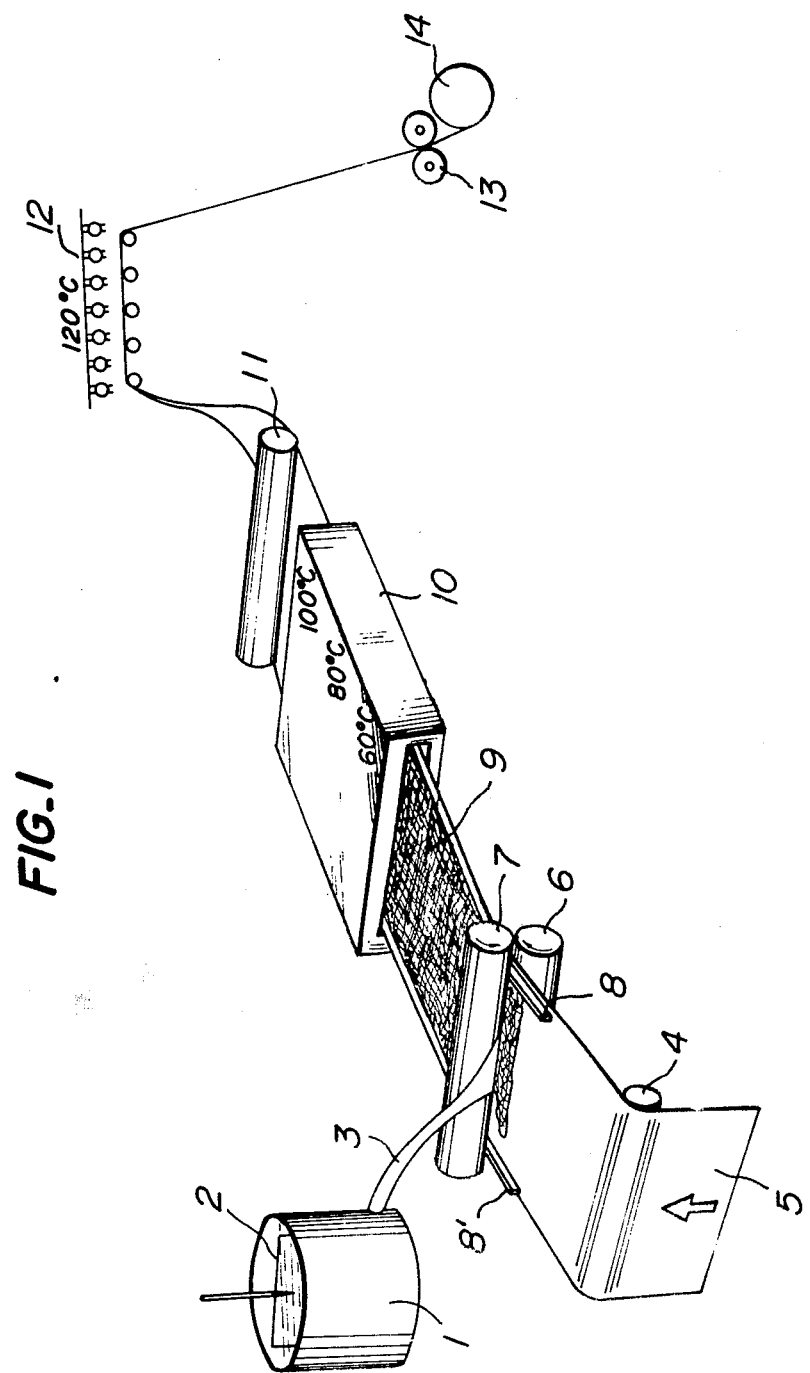
FIG. 1 is a schematic illustration for preparing the sound proof material according to the invention.

As the glass cloth to be coated with powdery lead, there is used one obtained by knitting glass yarns with a filament diameter of 0.16 mm in a length per unit weight of 14.8 km/kg. This cloth has a thickness of 0.14 mm and a warp density of 32 per 25 mm and a weft density of 25 per 25 mm. Further, the tensile strength of the cloth is 90 kg in a longitudinal direction and 70 kg in a transverse direction. After the impregnation treatment with lead containing resin according to the invention as mentioned below, the tensile strength is increased to about 140%.

Moreover, a glass cloth made from glass yarns with a filament diameter of 0.10 mm can be used. In this case, however, the cloth should have a warp density of about 39/25 mm and a weft density of about 40/25 mm; otherwise, the impregnating resin penetrates through the cloth. In any case, the former cloth is preferably used.

The impregnating resin to be used in the invention contains a liquid resin as an ingredient. A typical example of the liquid resin consists of 50 volume % of vinyl chloride resin, 40 volume % of vinyl acetate resin and 10 volume % of butadiene-styrene rubber and contains 6 kg of toluene as a solvent based on 4 kg of the above resin mixture.

To the liquid resin is further added 3 kg of aluminum hydroxide as a thickening agent for increasing the viscosity of the liquid and an additive for rendering a final product to incombustibility.

Further, 2 kg of phosphoric acid ester is added in order to improve the plasticity of the impregnating resin as a whole.

According to the invention, the impregnating resin further contains 13 kg of powdery lead of 100-350 mesh, preferably 280 mesh (corresponding to 100-325 mesh, preferably 270 mesh according to ASTM E-11) as an essential ingredient. After the addition of powdery lead, the impregnating resin is thoroughly and continuously agitated.

Moreover, the liquid resin may consist 55-65 volume % of vinyl chloride resin and 45-35 volume % of vinyl acetate resin and the impregnating resin may contain 30% of aluminum hydroxide based on a total solid content in accordance with the mixing conditions and the like.

The production of the sound proof material according to the invention will be described below with reference to FIG. 1.

At first, the impregnating resin containing the above mentioned ingredients is thoroughly and homogeneously agitated in a continuous agitating tank 1 by means of an agitating arm 2. In this case, the agitated material has a viscosity of about 35,000-50,000 cps, a solid content of 77±1% and a specific gravity of 2.16 at 25° C.

Then, the impregnating resin is run out from the tank 1 through an outlet duct 3 onto a glass cloth 5 fed from a feed roll (not shown). The glass cloth 5 is guided by a guide roll 4 and drawn by press rolls 6, 7 and fed to a first drying apparatus 10. During the movement of the glass cloth 5, the impregnating resin is applied on a side of the glass cloth 5 at a certain width defined by a pair of width-limiting members (rolls) 8, 8' and a constant thickness defined by the press rolls 6, 7. As the press rolls 6, 7, rubber rolls are preferably used because the impregnating resin is satisfactorily extended and does not adhere to the roll.

The glass cloth 9 coated with the impregnating resin is passed through the first drying apparatus 10 having a length of about 10 m, during which preliminary drying of the solvent is performed. In this apparatus, the drying temperature is gradually raised to 60° C., 80° C. and 100° C. as shown in FIG. 1. Moreover, the moving velocity of the cloth 9 is, for example, 20 m/min.

The dried cloth is guided on a roll 11 at the outlet of the drying apparatus 10, to effect a natural drying and then fed into a second drying apparatus 12, where the cloth is subjected to a final drying at about 120° C.

Finally, the dried cloth is passed through an edge-cutting apparatus 13 and then wound up on a take-up roll 14. In this way, the sound proof material according to the invention can be produced continuously.

In order to effectively perform the above continuous production process, it is important that the mixing ratio of the ingredients constituting the impregnating resin is within the above defined range. Because, if the amount of toluene or vinyl chloride resin is excessively beyond the upper limit, the uniform application of the impregnating resin is obstructed due to rapid gelation thereof.

The thickness of the sound proof material may be made to, for example, about 5 mm by changing the amount of the impregnating resin to be applied in accordance with the use purpose. Now, when using the above mentioned glass cloth with a thickness of 0.14 mm, the final product is preferable to have a total thickness of about 0.3-0.6 mm (preferably 0.5 mm or 0.2 mm at minimum). In the latter case, there can be obtained sound proof materials having rich flexibility.

According to the invention, the sound proof material is easily adhered to concrete or mortar wall at side of the glass cloth owing to the absence of lead impregnated coating layer and is applicable to concrete embedding process. Moreover, when the lead impregnated coating layer is formed on each side of the glass cloth, the resulting material may be adhered to the concrete or mortar wall through a strong adhesive.

In another embodiment of the invention, a glasswool layer having a thickness of about 25 mm is adhered to the lead impregnated side of the sound proof material prepared by the above mentioned process through a common adhesive. The resulting assembly is particularly useful for general building or as a noise separating wall. The thickness of the glasswool layer is not critical, but it may be about 50 mm.

As mentioned above, the sound proof material according to the invention has the lead impregnated coating layer at its one or both sides.

Figure 2:
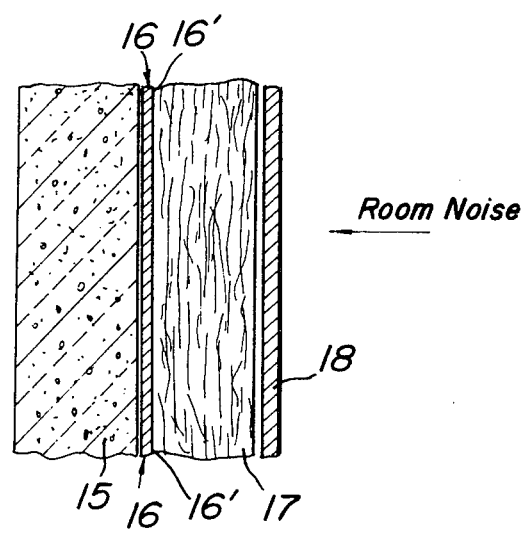
FIG. 2 is a schematic illustration of an embodiment of using the sound proof material according to the invention for insulating noise inside room.

In FIG. 2 is shown an embodiment of using the sound proof material according to the invention for general building. For convenience' sake, a dimension of each part is enlargedly shown.

The embodiment shown in FIG. 2 is the case of insulating noise emitted inside the room.

To a concrete wall 15 is adhered a non-impregnated side of a sound proof material 16 through a well-known adhesive. Moreover, the material 16 may sufficiently be adhered to a mortar wall or the like. Then, the lead impregnated side 16' of the material 16 is adhered with a glasswool or rockwool layer 17 having a thickness of about 17 mm through a common adhesive and a wall-finishing material 18 is disposed thereon through an adhesive. (In this figure, the layer 17 and the material 18 are shown in a separated state.)

In this embodiment, the glasswool or rockwool layer 17 serves as a noise absorption member against a sound source inside the room, while the sound proof material 16 acts to insulate the noise.

In order to insulate the noise from the exterior, the arrangement of each part shown in FIG. 2 is reversed toward the outside of the room. In this case, a waterproof sheet or the like is used instead of the wall-finishing material 18 and if necessary, the sheet is subjected to a mortar or resin finishment by wire netting process. Moreover, the glasswool layer may easily be adhered to the sheet, mortar, resin or the like.

Figure 3:
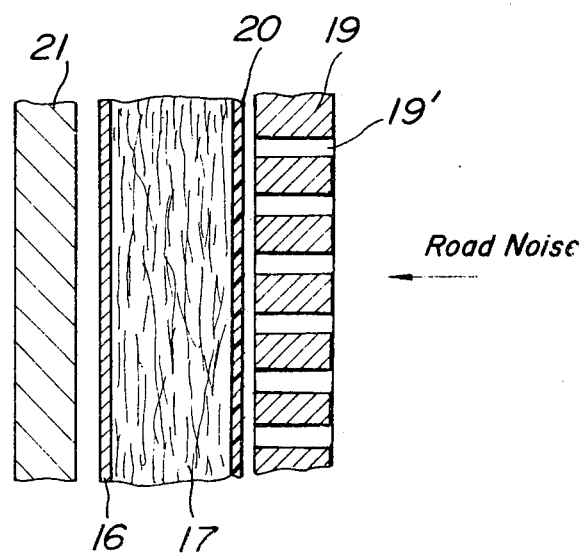
FIG. 3 is a schematic illustration of an embodiment of using the sound proof material according to the invention as a road noise separating wall.

In FIG. 3 is shown an embodiment of using the sound proof material according to the invention as a noise separating wall for highway or the like.

At first, a sound absorption perforated board 19 with a thickness of 30 mm is disposed at the side of the road to effect a primary noise absorption by apertures 19' of the board 19. Then, the sound proof material 16 according to the invention is arranged at the side of the board 19 opposite to the road through a waterproof polyethylene sheet 20 with a thickness of 0.05 mm and the glasswool or rockwool layer 17. In this arrangement, the glasswool or rockwool layer acts to effect a secondary noise absorption and the sound proof material 16 acts to insulate the noise. In this figure, numeral 21 represents a non-perforated board. In order to clarify the position of the parts arranged, each part is shown in a separated state, but these parts are in fact adhered to each other through an adhesive.

The sound proof material according to the invention can advantageously be used in noise and heat insulating work, fireproof work, moisture proof work and the like of pipings owing to easiness of tape cutting and satisfactory flexibility.

Although the impregnating resin contains vinyl chloride resin and the like, when the lead impregnated glass cloth is dried within the above defined composition range, the resulting sound proof material does not smoke nor burn. Further, when the sound proof material is used together with the glasswool or rockwool layer, the fire proofness is further improved by a synergistic action of incombustibility inherent to the glasswool or rockwool layer. According to the invention, sound proof materials having high performances can be provided cheaply.

Figure 4:
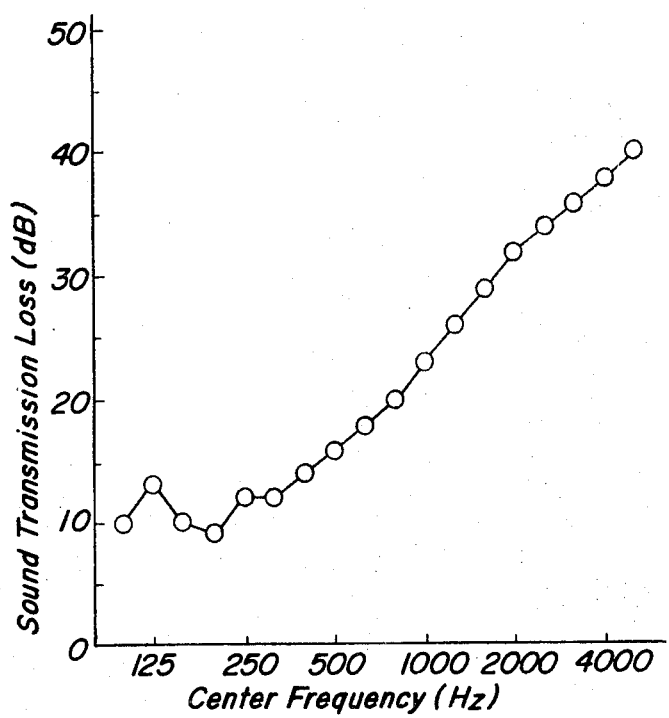
FIG. 4 is a graph showing a characteristic of sound transmission loss in the sound proof material according to the invention.

In FIG. 4 is shown a test result for sound transmission loss of the sound proof material according to the invention.

The test was made with respect to the structure of FIG. 2 having no wall-finishing material 18 according to a measurement JIS J18A 1416. In this case, the thickness of glass cloth was 0.17 mm, that of powdery lead-containing impregnated coating layer was 1 mm and that of glasswool layer (SID-G board, trade name) was 50 mm.

As apparent from FIG. 4, the sound transmission loss at 1,000 Hz is as high as about 25 dB.

The sound proof material according to the invention can widely be used in various applications. For instance, by making the thickness of the powdery lead containing impregnated coating layer thicker, the sound proof material can be used as noise insulating and X-ray shielding material.

What is claimed is:

1. A sound proof material for buildings comprising a glass cloth and a lead coating formed on at least one side of said glass cloth, said material being prepared as a flexible noise separating member by mixing powdery lead of finer particle size with an impregnating resin, a solvent, a plasticizer and the like and applying them on said glass cloth, and wherein a glasswool or rockwool layer is further adhered to an outer surface of said lead coating as a noise absorption member.

2. A sound proof material as claimed in claim 1, wherein said powdery lead has a particle size of about 100-350 mesh.

3. A sound proof material as claimed in claim 1, wherein said powdery lead has a particle size of about 280 mesh.

4. A sound proof material for buildings comprising a glass cloth and a lead coating formed on at least one side of said glass cloth, said material being prepared as a flexible noise separating member by mixing powdery lead of finer particle size with an impregnating resin, a solvent, a plasticizer and the like and applying them on said glass cloth, and wherein said material is prepared by providing an impregnating resin consisting of about 50 volume % of vinyl chloride resin, about 40 volume % of vinyl acetate resin and about 10 volume % of butadiene-styrene rubber, adding about 6 kg of toluene as a solvent, about 3 kg of aluminum hydroxide as an additive, about 2 kg of phosphoric acid ester as a plasticizer and about 13 kg of powdery lead having a particle size of about 100–350 mesh based on 4 kg of said impregnating resin, and applying them on at least one side of a glass cloth made from glass yarns with a filament diameter of 0.16 mm and having a warp density of 32/25 mm and a weft density of 22/25 mm.

* * * * *